United States Patent [19]
Toyoda et al.

[11] Patent Number: 5,734,265
[45] Date of Patent: Mar. 31, 1998

[54] METHOD TO COMPUTE PROBABLE SPEED OF A VEHICLE EQUIPPED WITH A MINI TIRE

[75] Inventors: Keiji Toyoda; Noriyuki Takemasa; Wataru Ozawa; Susumu Yamada; Hiroshi Oshiro, all of Hamakita, Japan

[73] Assignee: Nisshinbo Industries Inc., Tokyo, Japan

[21] Appl. No.: 618,785

[22] Filed: Mar. 20, 1996

[30] Foreign Application Priority Data

Oct. 4, 1995 [JP] Japan ................. 7-282532

[51] Int. Cl.$^6$ ................. G01P 3/42; G01P 3/56
[52] U.S. Cl. ................. 324/161; 364/565
[58] Field of Search ................. 324/160, 161, 324/166; 364/565, 426.018, 426.019, 426.041

[56] References Cited

U.S. PATENT DOCUMENTS 5,299,131  3/1994  Haas et al. ................. 364/426.03

OTHER PUBLICATIONS

Japan Unexamined Patent Application Heisei 3 (1991)-5272, No translation.

*Primary Examiner*—Walter E. Snow
*Attorney, Agent, or Firm*—Nikaido, Marmelstein, Murray & Oram LLP

[57] ABSTRACT

A method is provided to compute the probable body speed of a vehicle equipped with a mini tire as a spare tire, specifically when the mini tire is mounted. The wheel speeds of the four wheels are measured, and if the speed does not satisfy the predetermined formula relating to the wheel base and tread of the vehicle to a wheel speed, then a probable vehicle body speed is derived by the normal method. The speed thus derived is corrected by the diameter of the mini tire to compute a new probable vehicle body speed.

6 Claims, 4 Drawing Sheets

METHOD TO COMPUTE PROBABLE SPEED OF A VEHICLE EQUIPPED WITH A MINI TIRE

BACKGROUND OF THE INVENTION

This invention relates to a method to compute the probable body speed of a vehicle equipped with a mini spare tire.

Many vehicles are equipped with a mini tire as the spare tire. The diameter of a mini tire is smaller than a regular tire, in which case the speed measured by the antilock brake control device is greater than that of a regular tire, and braking control will not be accurate. To overcome this, conventionally the mounted position of the mini tire and other factors have been inferred from each wheel speed (see Publication of Unexamined patent Application Heisei 3(1991)-5272). However, if for example the wheels are spinning but the presence of the mini tire cannot be inferred because of insufficient information, then antilock control proceeds as it would for a normal tire. As a result, the probable vehicle body speed is computed to be higher than its actual speed, resulting in inaccurate control, possibly leading to insufficient speed attenuation.

OBJECT AND EFFECTIVENESS OF INVENTION

This invention is designed to compute the probable body speed of a vehicle equipped with a mini tire as the spare tire, specifically when the spare tire is mounted.

A simple method is provided to compute the probable body speed of a vehicle equipped with a mini tire as a spare tire, specifically when the mini tire is mounted. The wheel speeds of the four wheels are measured, and if the speed does not satisfy a formula relating to the wheel base and tread of the vehicle to a wheel speed, then a probable vehicle body speed is derived by the normal method. The speed thus derived is corrected by the diameter of the mini tire to compute a new probable vehicle body speed.

In a possible scenario, should an antilock control action be performed immediately after a vehicle is in motion, the diameter of the mini tire cannot be corrected, in which case the probable vehicle speed is computed to be too high, possibly extending the braking distance. However, this invention determines the presence or absence of a mini tire by a simple method using relational formulas (Equation 5, etc.), then easily derives the probable vehicle body speed corrected for a mounted mini tire.

SIMPLIFIED EXPLANATION OF THE DIAGRAMS

The above and other objects and the attendant advantages of the present invention will become readily apparent by reference to the following detailed description when considered in conjunction with the accompanying drawings wherein.

Figure 4:
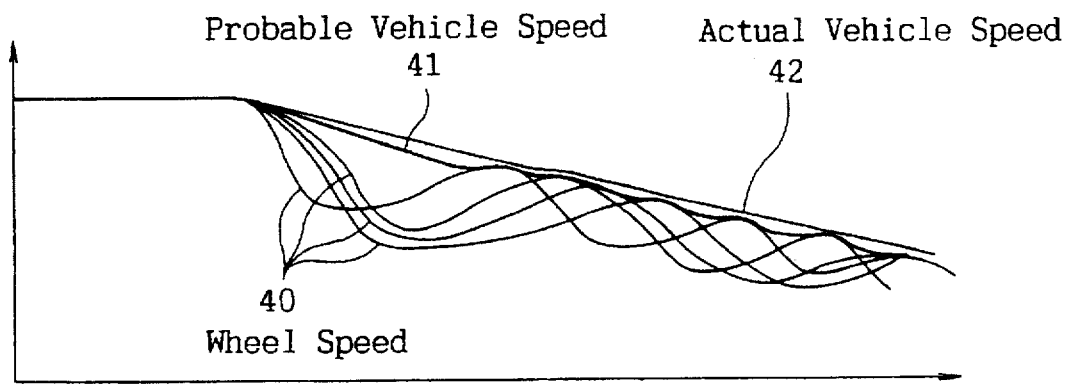

FIG. 4 explanatory diagram of how probable vehicle body speed is computed.

DETAILED DESCRIPTION OF THE INVENTION AND OF THE PREFERRED EMBODIMENT

1. Overview of brake control device 10

Figure 1:
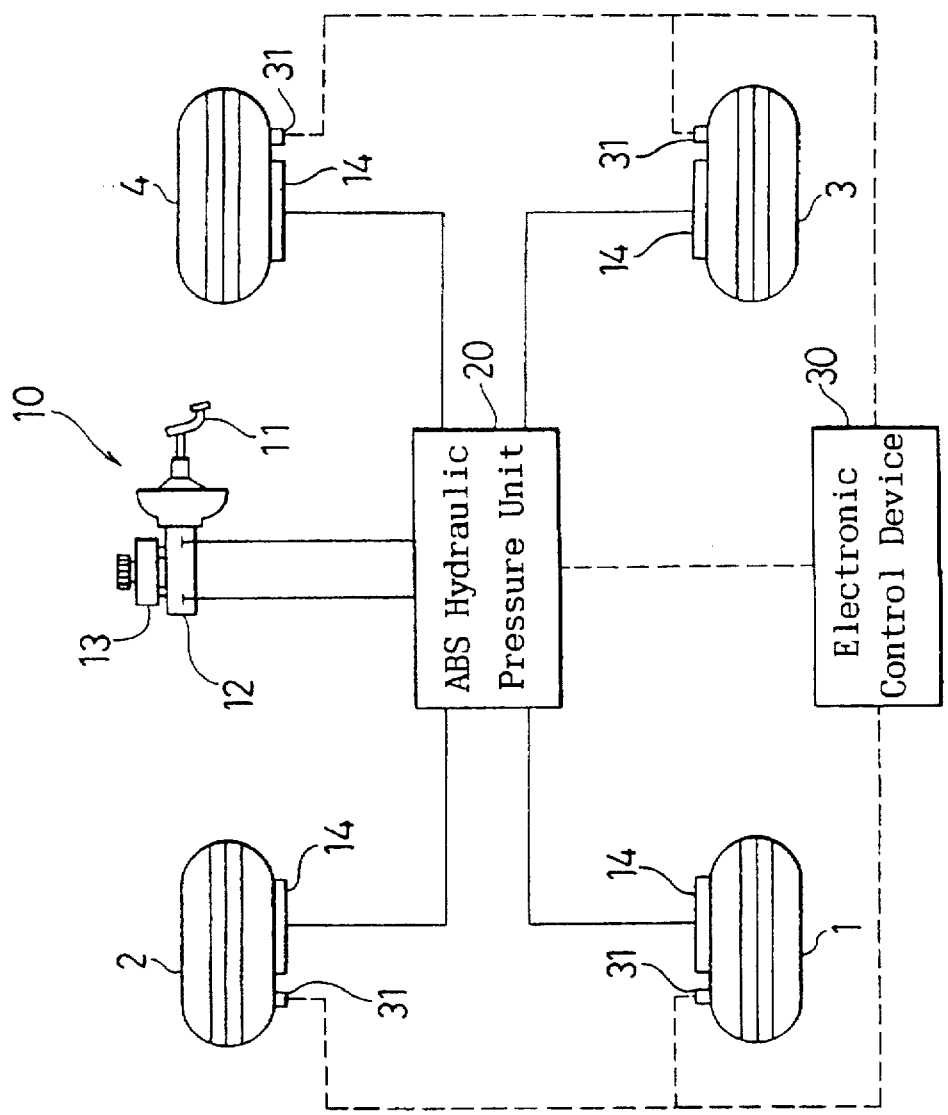
FIG. 1 is a conceptual diagram of an antilock brake control device.
Figure 2:
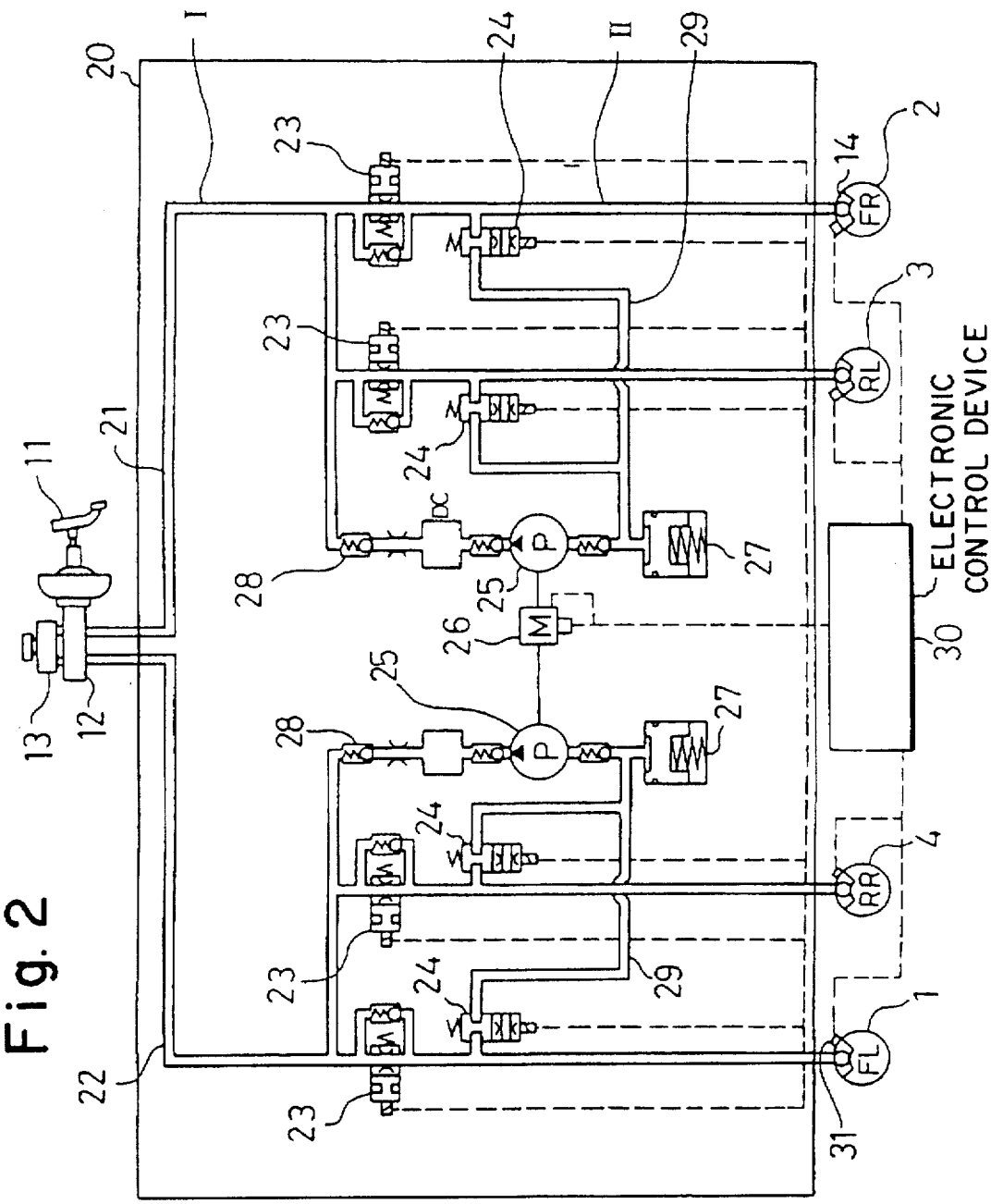
FIG. 2 illustrates the brake circuits of an antilock brake control device.

An example of the brake control device is shown in FIG. 1 and FIG. 2. During normal braking, when the driver presses the brake pedal 11, brake fluid is supplied from the main reservoir 13 to generate a brake pressure at the master cylinder 12. The brake pressure so generated is applied to the inlet valve 23 installed in the main brake line and to the respective wheel cylinder 14 of each wheel 1–4 to brake the vehicle.

Should, for example, the brake pedal be pressed hard causing the wheels to slip, an antilock control action will be triggered. The electronic control device 30, receiving signals from the wheel speed sensors 31, controls the operation of the ABS hydraulic pressure unit 20 accordingly in order to prevent the locking of each wheel 1–4.

The electronic control device 30 can be a customized hardware device, or can be configured from an input device, processor, output device, and other general computer components.

2. Configuration of brake circuits

FIG. 2 illustrates a diagonal configuration which has two independent circuits, a first brake circuit 21 and a second brake circuit 22, through the master cylinder 12.

The main reservoir 13 stores the brake fluid supplied to the master cylinder 12. The first brake circuit 21 is connected to the wheel cylinders 14, 14 of the right front wheel 2 and left rear wheel 3 via the inlet valve 23; and via the outlet valves 24, to the auxiliary reservoirs 27. Similarly, the second brake circuit 22 is connected to the wheel cylinders 14 of the right rear wheel 4 and left front wheel 1 via the inlet valves 23, and via the outlet valves 24, to the auxiliary reservoirs 27.

3. Relative speed of each wheel during turning

Figure 3:
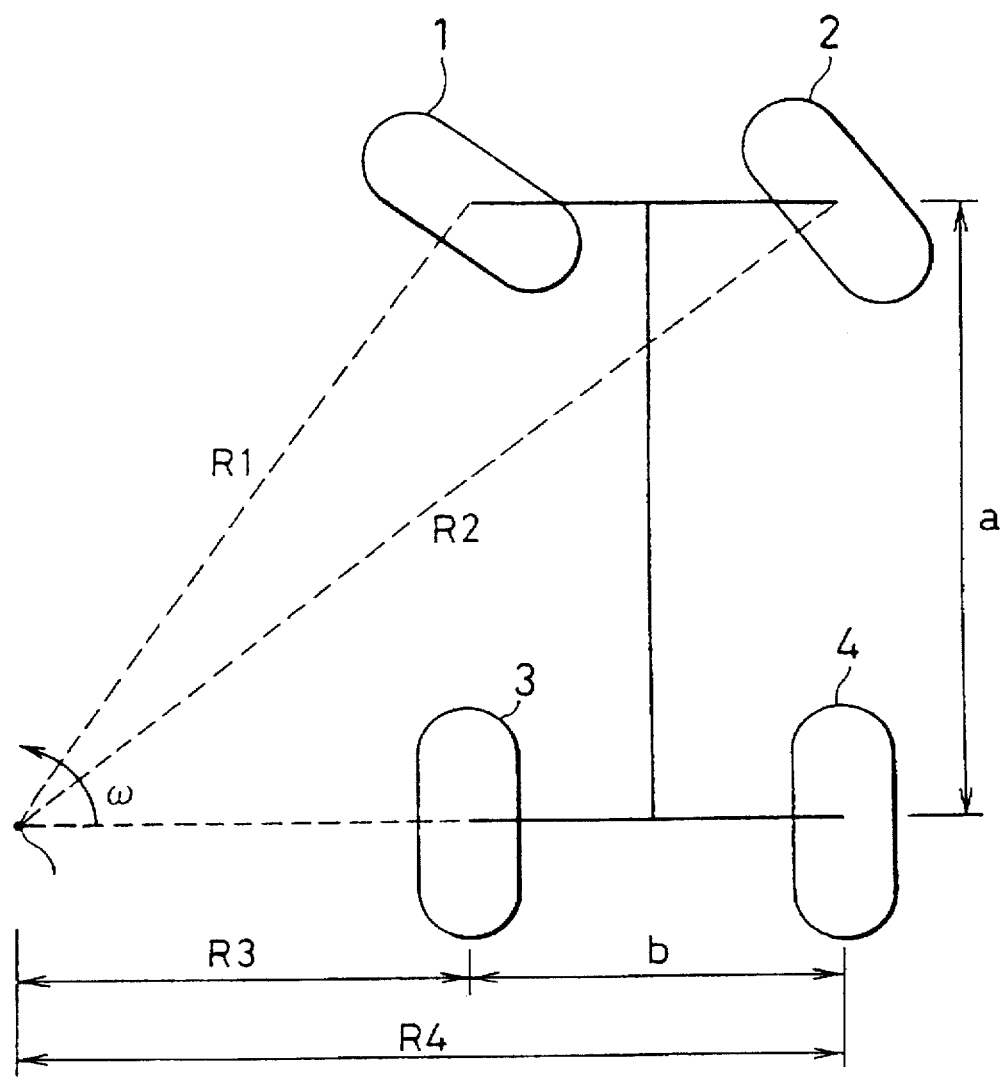
FIG. 3 illustrates the state of the wheels in making a left turn.

The speed of each wheel is different when the car is making a turn. As shown in FIG. 3 for a left turn, each wheel draws a turning radius of R1, R2, R3, R4 around the axis of rotation, the relationship of which can be expressed by Equations 1–4, which use the wheel base (a) and tread (b). In these equations, $\omega$ is the angular velocity about the axis of rotation of the circular path drawn by the vehicle. Similar relational formulas can be obtained for a right turn by a simple left and right reversal.

$$V1 = \omega R1 \ (R3^2 + a^2)^{\frac{1}{2}} \times \frac{V3}{R3} \tag{1}$$

where

V1=Speed of left front wheel

V3=Speed of left rear wheel

R1=Turning radius of left front wheel

R3=Turning radius of left rear wheel $\omega$=Angular velocity of rotation of vehicle a=Wheel base $$V2 = \omega R2 = ((R3 + b)^2 + a^2)^{\frac{1}{2}} \times \frac{V3}{R3} \tag{2}$$

where

V2=Speed of right front wheel

R2=Turning radius of right front wheel b=Tread $$V3 = \omega R3 \quad (3)$$

$$V4 = \omega R4 = (R3 + b) \times \frac{V3}{R3} \quad (4)$$

where

V4=Speed of right rear wheel

R4=Turning radius of right rear wheel

If the vehicle is making a normal turn, for example, without spinning its tires, and normal tires of the same diameter are mounted on all four tires, then each wheel speed 40 during the turn will satisfy Equations (1)–(4). Each wheel speed will also satisfy Equation 5, or Equation 6, its approximation formula, which are derived from Equations (1)–(4). In contrast, if a mini tire is mounted, then neither Equation 5 nor Equation 6 is satisfied.

However, the actual wheel speed does not completely satisfy the equations because of various fluctuations, but does satisfy the equations within a certain range as determined by the vehicle, the running conditions, and other factors.

$$V1^2+V4^2=V2^2+V3^2 \quad (5)$$

$$V1+V4=V2+V3 \quad (6)$$

The following sections will explain control actions during various braking operations.

4. Normal braking

For normal braking, when the driver presses the brake pedal 11, brake fluid is supplied from the main reservoir 13 to generate a brake pressure at the master cylinder 12. The brake pressure so generated is applied to the inlet valves 23 installed in the main brake lines and to the wheel cylinder 14 of each wheel 1–4 to brake the vehicle.

5. Antilock brake control

Should a wheel slip during braking, locking of the wheel is controlled as follows. The brake pressure is exhausted from the wheel cylinder 14 by the operation of the outlet valve 24, pump 25 in the reflux line 29, and inlet valve 23 in the main brake line I to the auxiliary reservoir 27 via the main brake line II and outlet valve 24. The pressure is returned to the main brake line I via the pump 25 (motor 26) and the dumping chamber DC, then supplied to the wheel cylinder 14 via the inlet valve 23 and main brake line II.

6. Computation of probable vehicle body speed if normal tires are mounted

As shown in FIG. 4, during an antilock control operation, the probable vehicle speed 41 as manifested by any of the wheels is close to the actual vehicle body speed 42. Normally therefor, the fastest wheel speed of the four wheel speeds 40 will be the probable vehicle speed 41 that is close to the actual vehicle speed 42. However, if all four wheels are about to lock, this principle cannot be used, and a probable vehicle speed 41 attenuated by a prescribed gradient is to be used.

Next, the computation of the probable vehicle body speed when a mini tire is inferred to be mounted, is explained.

7. Determination of presence of mini tire

The wheel speed 40 is measured using the wheel speed sensor 31 attached to each wheel. The wheel speed 40 is substituted into Equation 5 or Equation 6, then analyzed as to whether the equation is satisfied within the necessary range.

If the equation is satisfied, a mini tire is deemed not to be mounted, and the vehicle body speed is computed as for normal tires.

If the equation is not satisfied, then either a mini tire is mounted, or the tires are spinning, and enough information may not be available to determine on which tire a mini tire is actually mounted. In this case, it is postulated that a mini tire is mounted, and the discrepancy caused by the mini tire is corrected.

The actual wheel speed will fluctuate with various conditions, hence the two sides of the formulas relating to the wheel speed to the wheel base and the tread will not be absolutely equal. Accordingly, Equation 5 or Equation 6 is considered to be satisfied if the inequality of Equation 7 or Equation 8 is satisfied for a specified period of time, for example 0.1 seconds. If this condition is not satisfied, then Equation 5 or Equation 6 will not be satisfied.

$$|V1^2+V4^2-V2^2-V3^2|<\epsilon \quad (7)$$

where $\epsilon$=a small value $$|V1+V4-V2-V3|<\epsilon \quad (8)$$

8. Computation of probable vehicle speed if diameter of mounted mini tire is known (Method 1)

First, the vehicle body speed is computed by the normal method for normal tires, then that speed is corrected for the discrepancy arising from the mini tire.

If the diameter of the mini tire is known, the vehicle body speed is increased by a prespecified ratio; hence the probable vehicle speed 41 is derived by reducing the computed speed by the known amount of increase. For example, the computed vehicle body speed is simply multiplied by a fixed ratio (k/K), where k is the diameter of the mini tire and K is the diameter of a normal tire.

9. Computation of probable vehicle speed if diameter of mounted mini tire is known (Method 2).

The fastest speed of the measured speeds of the four wheels is derived. The wheel with the fastest speed so derived is inferred to be the mini tire, and the speed therein is corrected by a specified coefficient (k/K). This corrected speed and the other wheel speeds are used, for example, in the conventional method to derive the probable vehicle body speed 41.

10. Computation of probable vehicle body speed using second fastest wheel speed

The speed of a mini tire is faster than that of a normal tire, hence the wheel with the fastest of the four speeds of the four wheels is assumed to be mounted with a mini tire. The wheel with the second fastest speed will be mounted with a normal tire, and that speed is inferred to approximate the actual vehicle body speed. Therefor, the speeds of the four wheels are measured, then using the second fastest speed at all times, the probable vehicle body speed 41 corrected for the mini tire is computed as shown in FIG. 4.

The above and other objects and the attendant advantages of the present invention will become readily apparent by reference to the following detailed description when considered in conjunction with the accompanying drawings wherein:

We claim:

1. A method to compute the probable body speed of a vehicle equipped with a mini tire of known diameter as the spare tire, comprising the steps of:

measuring a speed of each of four wheels;

comparing the measured speed to a predetermined formula and if a speed so measured does not satisfy the formula comparing a wheel base and tread of a vehicle to the wheel speed;

deriving a probable vehicle body speed based on the four wheels mounted with normal tires corrected by the diameter of the mini tire to obtain a corrected probable vehicle body speed.

2. A method to compute the probable body speed of a vehicle equipped with a mini tire of known diameter as the spare tire, comprising the steps of:

measuring a speed of each of four wheels;

comparing the speed so measured to a predetermined formula relating the wheel base and tread of the vehicle to the wheel speed;

deriving a fastest speed of the four measured wheel speed;

correcting the fastest speed by the known diameter of the mini tire; and computing a probable vehicle body speed from the corrected wheel speed and the speeds of the other wheels.

3. A method to compute the probable body speed of a vehicle equipped with a mini tire as a spare tire, comprising the steps of:

measuring a speed of each of four wheels; and comparing the measured speed to a predetermined formula relating the wheel base and tread of the vehicle to the wheel speed and if a speed so measured does not satisfy the formula then computing the probable vehicle body speed using a second fastest speed of the four wheel speeds.

4. The method to compute the probable body speed of a vehicle equipped with a mini tire as a spare tire as claimed in claim 1, wherein the formula comprises $$V1^2 + V4^2 = V2^2 + V3^2,$$

where

V1=Speed of left front wheel,

V2=Speed of right front wheel,

V3=Speed of left rear wheel, and V4=Speed of right rear wheel.

5. The method to compute the probable body speed of a vehicle equipped with a mini tire as a spare tire as claimed in claim 2, wherein the formula comprises $$V1^2 + V4^2 = V2^2 + V3^2,$$

where

V1=Speed of left front wheel, V2=Speed of right front wheel, V3=Speed of left rear wheel, and V4=Speed of right rear wheel.

6. The method to compute the probable body speed of a vehicle equipped with a mini tire as a spare tire as claimed in claim 3, wherein the formula comprises $$V1^2 + V4^2 = V2^2 + V3^2,$$

where

V1=Speed of left front wheel,

V2=Speed of right front wheel,

V3=Speed of left rear wheel, and

V4=Speed of right rear wheel.

* * * * *